United States Patent
Geissler et al.

(10) Patent No.: US 6,944,923 B2
(45) Date of Patent: Sep. 20, 2005

(54) MACHINING UNIT FOR A PROGRAM-CONTROLLED MILLING AND DRILLING MACHINE

(75) Inventors: Alfred Geissler, Pfronten (DE); Robert Jung, Pfronten (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 12 days.

(21) Appl. No.: 10/700,801

(22) Filed: Nov. 3, 2003

(65) Prior Publication Data

US 2004/0134050 A1 Jul. 15, 2004

(30) Foreign Application Priority Data

Nov. 4, 2002 (DE) .......................................... 102 51 257

(51) Int. Cl.$^7$ ................................................. B23P 23/00
(52) U.S. Cl. .................... 29/26 A; 409/216; 409/201; 408/236
(58) Field of Search ................................ 409/201, 211, 409/216, 231, 204, 230; 29/26 A; 408/236

(56) References Cited

U.S. PATENT DOCUMENTS

| | | | | |
|---|---|---|---|---|
| 3,828,649 A | * | 8/1974 | Lecailtel et al. ............ | 409/201 |
| 4,378,621 A | * | 4/1983 | Babel ......................... | 29/26 A |
| 4,478,540 A | * | 10/1984 | Sachot ....................... | 409/211 |
| 4,559,682 A | * | 12/1985 | Sachot ....................... | 29/26 A |
| 4,610,583 A | * | 9/1986 | Malzkorn et al. ........... | 409/211 |
| 4,635,329 A | * | 1/1987 | Holy et al. ................. | 409/216 |
| 4,841,795 A | * | 6/1989 | Obrietan ..................... | 74/417 |
| 5,127,779 A | * | 7/1992 | Yang .......................... | 409/201 |
| 5,391,026 A | * | 2/1995 | Wu et al. .................... | 409/201 |
| 5,413,439 A | * | 5/1995 | Wu et al. .................... | 409/211 |
| 5,533,846 A | * | 7/1996 | Geissler ...................... | 409/201 |
| 5,813,283 A | * | 9/1998 | Chen et al. .................. | 74/417 |
| 6,669,416 B2 | * | 12/2003 | Klement ..................... | 409/201 |

FOREIGN PATENT DOCUMENTS

| | | |
|---|---|---|
| DE | 41 22 711 | 2/1992 |
| DE | 195 22 711 | 1/1997 |
| GB | 2167327 A * | 5/1986 |
| GB | 2223194 A * | 4/1990 |

OTHER PUBLICATIONS

Manfred Weck, "Werkzeugmaschinen", VDI Verlag D0sseldorf 1988, 3$^{rd}$ ed., pp. 188–189, Figure 3–152.

* cited by examiner

*Primary Examiner*—Erica Cadugan
(74) *Attorney, Agent, or Firm*—The Maxham Firm

(57) ABSTRACT

A machining unit for a program-controlled milling and drilling machine. A head support movable in several coordinate axes has an axis of rotation pointing forward and downward at a 45° angle. A swivel head arranged on a front side of the head support is rotatable about the axis of rotation. A spindle nose is fixedly mounted on the swivel head and has a working spindle with an axis extending at an angle of 45° relative to the axis of rotation. A spindle motor is aligned coaxially with the axis of rotation and a bevel gear arranged in the swivel head for the motor shaft. The swivel head has a cylindrical hollow housing member coaxial with the axis of rotation and in which the spindle motor is mounted. The head support has a housing neck in which the housing member of the swivel head is rotatably supported.

14 Claims, 3 Drawing Sheets

MACHINING UNIT FOR A PROGRAM-CONTROLLED MILLING AND DRILLING MACHINE

BACKGROUND OF THE INVENTION

1. Field of the Invention

The present invention relates generally to machine tools, and more specifically to a machining unit for a program-controlled milling and drilling machine.

2. Discussion of Related Art

Machining units having swivel and/or rotary heads for selectively machining a workpiece horizontally or vertically at one position, have been used for some time. Such units typically carry a working spindle and provide movement of the spindle in horizontal and vertical axes.

German patent publication 44 02 084 describes a machining unit having a support housing movable along a machine column. In this unit, the end wall is slanting with respect to vertical by 45° and is downwardly inclined. The end wall guides a swivel milling head having a mounting surface also inclined by 45° relative to the vertical. The swivel milling head carries a working spindle arranged at 45° relative to the axis of rotation which, by corresponding rotation of the swivel milling head, can be pivoted between horizontal and vertical machining positions. The support housing for the swivel head accommodates a controllable motor having a shaft coaxial with the axis of rotation. The shaft drives the working spindle via a pair of bevel gears and a set of sliding gears at two different speeds, as desired.

One shaft of the spindle motor is hollow and surrounds a solid shaft passing through the motor housing and the swivel head with enough clearance for turning the swivel head. A worm drive is attached to the inner end of the hollow shaft. The housing of the swivel head is mounted on the outer lower end of the shaft. An annular swivel head end projection, coaxial with the 45° axis of rotation, includes radial serrations. An annular recess of the head support accommodates complementary radial serrations. The swivel head is positively fixed at a specified angular position by positive engagement of both radial serrations. The central solid shaft is axially slidable and connected with a resiliently biased pressure medium cylinder via an end plate.

In this known device, the fixation of the swivel head at given angular positions means that machining of a workpiece is only possible at given spindle positions. In addition, the manner of fixing the swivel head is relatively complicated.

SUMMARY OF THE INVENTION

The present invention relates to a machining unit for a program-controlled milling and drilling machine. In one embodiment it has a head support movable in several coordinate axes and includes an axis of rotation pointing forward and downward by 45°. A swivel head is arranged at a front face of the head support and is rotatable about the axis of rotation. A spindle nose is fixedly mounted on the swivel head and has a working spindle with an axis extending at an angle of 45° relative to the axis of rotation.

It is one object of the invention to provide a machining unit for a milling and drilling machine, with a simplified structural design and increased rigidity. It is also an object to enable more universal operations, for example, machining a workpiece while the milling head is pivoted.

In one embodiment of the present invention, the swivel head has a cylindrical hollow housing member coaxial with the axis of rotation. The spindle motor is fixed, in the housing member, and the head support has a cylindrical hollow housing neck in which the housing member of the swivel head is rotatably supported.

Fixation of the entire spindle motor in the swivel head and the rotatable support of the cylindrical hollow housing member, fixedly connected with the motor housing of the swivel head in the head support, ensures that when the swivel head is rotated about the 45° axis of rotation, the spindle motor also rotates together with the train of gears and the working spindle. This is accomplished without causing relative motions of the individual elements of this entire assembly. Fixation of the swivel head at a given angular position by positive engagement of radial serrations is not made so that the machining unit enables operations at any angular positions and also during a rotary motion of the swivel head. The disclosed arrangement of the spindle motor and support of the swivel head in the head support enables the use of powerful spindle motors and also increased cutting capacities while the dimensions of the machining unit remain approximately the same.

A direct electric drive coaxial relative to the 45° axis of rotation, or a conventional electric motor, can be used as a rotary drive for the swivel head. The motor is kinematically connected with a toothed ring mounted motor housing via a toothed belt drive. Clearance is provided with clamping and a spur gear. Such a drive train ensures a clearance-free transmission of high torques and the highly accurate positioning of the swivel head at given angular positions.

The swivel head is suitably supported within the housing of the head support by means of a supporting ring attached to the cylindrical hollow housing neck and engaging a peripheral groove. This peripheral groove is formed in the cylindrical hollow housing member of the swivel head. The ring is supported in the groove by means of three rolling bearings.

In prior swivel heads, the supply of energy, control signals, and rinsing liquid to the working spindle creates difficulty due to the confined space. In the present inventions this is addressed by the provision of an external flexible pipe for the protecting electric and liquid lines. This pipe extends from the head support to the housing of the working spindle, preferably in an arcuate fashion. The flexible pipe is connected with the head support by a turnable elbow connector. The pipe is pivotably connected with the spindle housing via an adapter.

The adapter design provides the desired pivoting capacity of the pipe connection with the spindle housing. For example, a bushing is provided having a convex external surface against which a pivotable end ring bears in a sliding fit. In order to prevent the electric and liquid lines from being damaged, the adapter may have freely rotatable rolling elements, in particular, rollers, against which the different lines abut.

BRIEF DESCRIPTION OF THE DRAWING

Further particularities and advantages of the invention will become clear from the following description of preferred embodiments with reference to the drawing, in which.

DETAILED DESCRIPTION OF THE PREFERRED EMBODIMENTS

Figure 1:
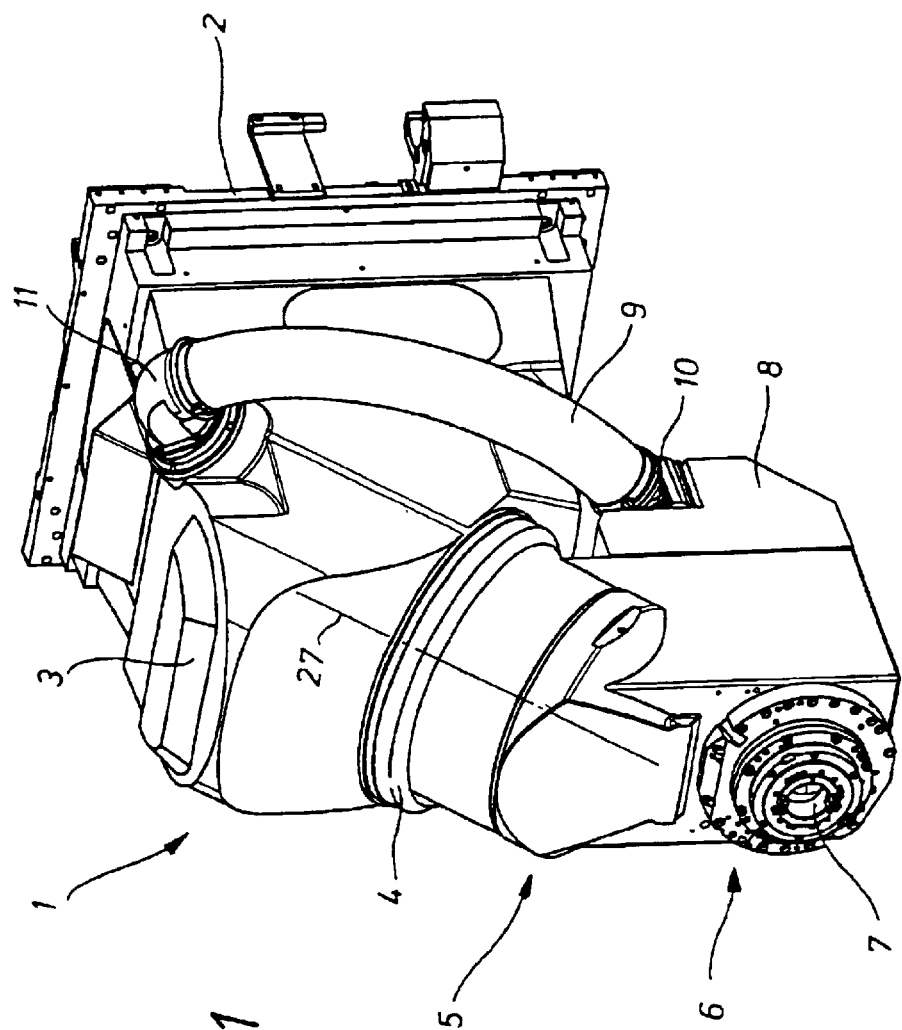
FIG. 1 is a perspective view of a machining unit according to one embodiment of the invention.

According to FIG. 1, the machining unit has angular head support 1, which comprises vertical rear plate-like or frame-like support structure 2, bulky central portion 3 and cylindrical hollow housing neck 4. The head support is inclined forwardly and downwardly at an angle of 45°. Swivel head 5 is rotatably supported in the head support about axis of rotation 27 of cylindrical hollow housing neck 4. On one side of the swivel head spindle nose 6 is rigidly mounted at a 45° angle with respect to axis of rotation 27 of housing neck 4. Working spindle 7 is supported transversely in the spindle nose. Flexible pipe 9 is pivotably connected to box-like rear portion 8 of the spindle nose by means of adapter 10. The top end of the flexible pipe communicates with the bulky central portion of the head support via rotatable elbow connector 11.

Figure 2:
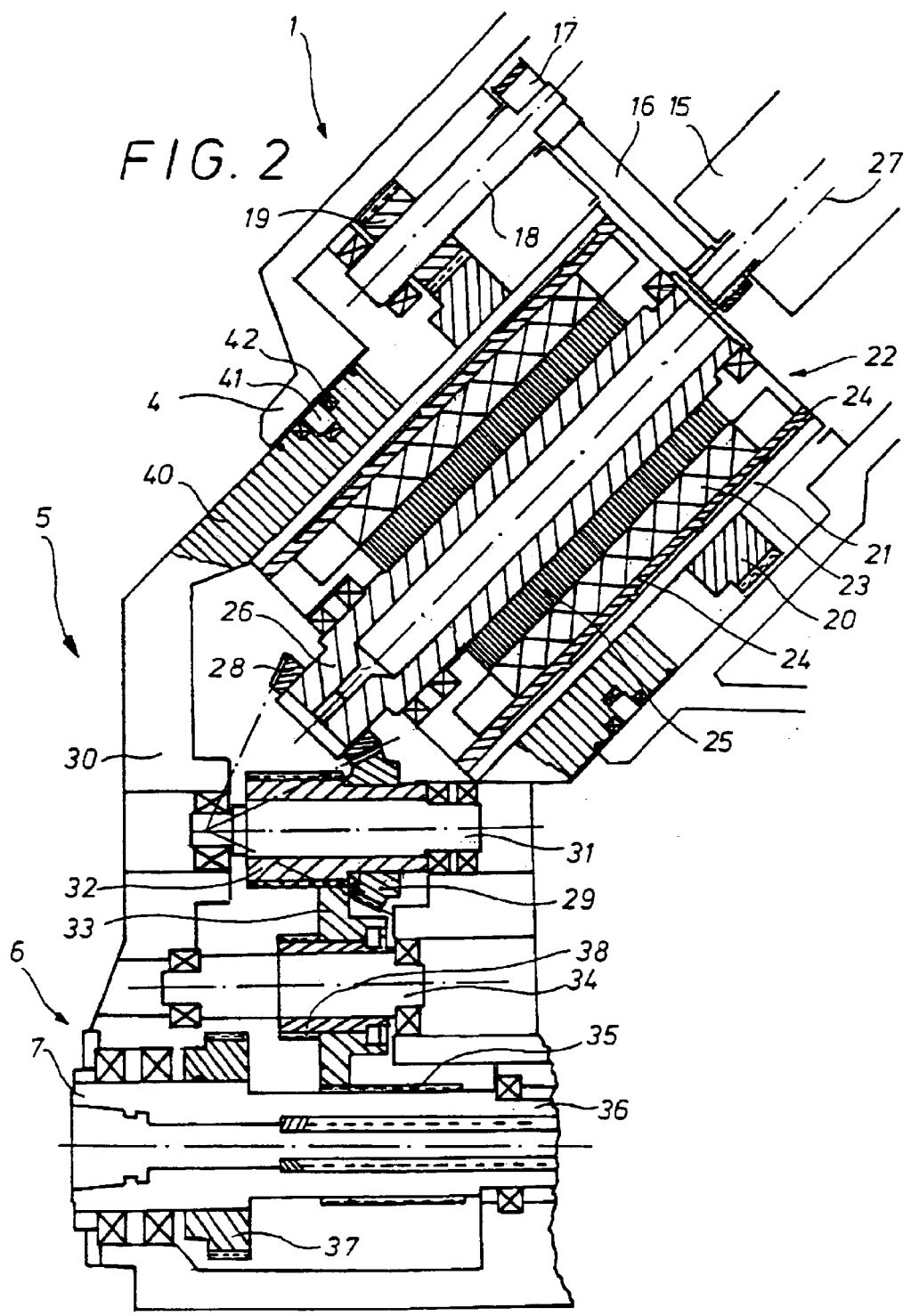
FIG. 2 shows a sectional view of the machining unit according to the FIG. 1 embodiment.

FIG. 2 shows a diagrammatic vertical section of the internal functional parts of the machining unit according to the FIG. 1 embodiment. Head support 1 accommodates adjusting motor 15. The adjusting motor has a shaft to drive toothed belt 16. The toothed belt maintains a constant clamping. This is part of what is understood herein as a cyclo drive. The toothed belt runs over two toothed gears 17. These gears are slightly displaced angularly with respect to each other (only one of which is shown in FIG. 2). Each toothed gear drives shaft 18 and pinion 19 mounted thereon. The pinion meshes with spur ring 20 mounted on motor housing 21. The motor housing is formed as a hollow cylinder around spindle motor 22. Stator 23 of spindle motor 22 is fixedly attached to motor housing 21 via sleeve 24. The sleeve is provided with cooling channels, as shown in FIG. 2. Rotor 25 of the spindle motor is fixedly attached to hollow shaft 26. As can be seen in FIG. 2, the axis of rotation 27 of hollow shaft 26 is inclined downwardly at an angle of 45° relative to vertical.

Bevel gear 28 is located on the protruding end of hollow shaft 26. This bevel gear meshes with bevel wheel 29. The bevel wheel is part of spur gear 32 mounted on shaft 31. The bevel wheel is freely rotatable in housing 30 of the swivel head. Spur gear 32 meshes with the major part of sliding gear 33 mounted on countershaft 34. Sliding gear 33 meshes with radial serrations 35 along the outer periphery of working spindle 36. Relatively large toothed gear 37, by moving sliding gear 33 on countershaft 34, engages smaller spur wheel 38. Toothed gear 37 is disposed on a front portion of working spindle 36.

Housing member 40 is coaxial with respect to axis of rotation 27 and engages cylindrical hollow housing neck 4 of head support 1. Robust and dimensionally stable supporting ring 41 is mounted on the internal wall of housing neck 4. This ring is guided in a peripheral groove formed in housing member 40 by means of three rolling bearings 42 designed for supporting radial and axial loads.

In order to horizontally machine a workpiece, a tool is clamped into working spindle 7, and spindle motor 22 attached to the housing of swivel head 5 is switched to the ON position. As can be seen in FIG. 2, hollow motor shaft 26 drives working spindle 7 through bevel gear 28, bevel wheel 29, sliding gear 33, and radial serrations 35. In order to place spindle nose 6 in an inclined or vertical position, adjusting motor 15 is switched on. Motor housing 21 turns about axis of rotation 27 through toothed belt 16, toothed gear 17, pinion 19, and spur ring 20. Since motor housing 21 is fixed with cylindrical hollow housing member 40 of swivel head 5, the rotation motion of spindle motor 22 effects a corresponding rotary or swivel motion of swivel head 5 and also of spindle nose 6 about axis of rotation 27. These rotary or swivel motions of swivel head 5 and spindle nose 6 are independent of the drive of working spindle 7.

Figures 3, 4:
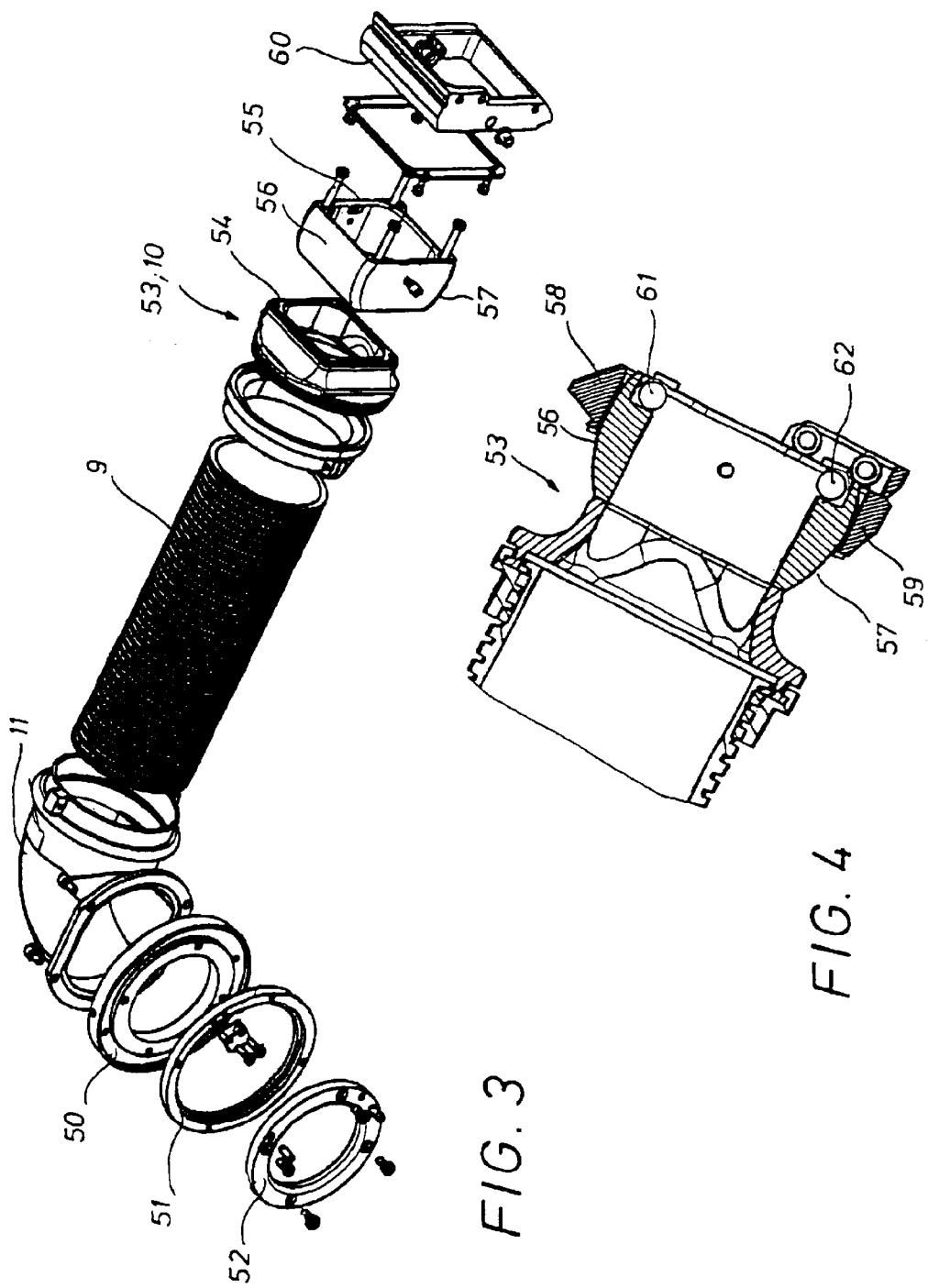
FIG. 3 is a perspective exploded view of the flexible pipe used for the machining unit according to FIG. 1 and having connections on both sides.
FIG. 4 shows a sectional view of the pivotable end connection of the flexible pipe with the adapter.

Flexible pipe 9, as shown in FIGS. 1, 3, and 4, preferably has a relatively high compressive strength and a sufficient flexibility for the application. In FIG. 3, elbow connector 11 is mounted on the top end of flexible pipe 9 by means of a conventional pipe clip. Rotary ring 50, spring ring 51, and end ring 52 are mounted on the outlet side of elbow connector 11 such that the elbow connector can be rotated about the central axis of rings 50, 51, and 52.

Referring now to FIG. 4, adapter 53, shown in longitudinal cross-section, is mounted on the other end of flexible pipe 9 by means of a conventional pipe clip. This adapter contains ring body 54 approximately rectangular in cross-section, to which an also rectangular insert 55 is attached by means of screws. Upper and lower surfaces 56 and 57 of the insert are convex or have an arc shape. Top portion 58 and bottom portion 59 of rectangular end member 60 are guided in a sliding fit on convex surfaces 56 and 57. Two lateral rolls 61 and 62 are supported in end member 60 as shown. As can be seen in FIG. 1, end member 60 is attached to box-like rear portion 8 of spindle nose 6. The length of flexible pipe 9 and the positions of both connections 10 and 11 are chosen such that the flexible pipe approximately maintains its flexibility and so that only the positions of elbow connector 11 and adapter 10 are affected when spindle nose 6 is moved about axis of rotation 27.

The invention is not limited to the above described embodiments. For example, depending on the desired application, elements 33 to 38, which are referred to herein as "speed changing gears," may be omitted. In this case spur gear 32 directly engages radial serrations 35 on working spindle 36, when the diameters are enlarged correspondingly. This results in the dimensions of the machining unit being smaller. Instead of the drive shown in FIG. 2, which consists of adjusting motor 15, toothed belt 16 and toothed gears 17, shaft 18, and pinion 19, it is also possible to use a direct electric drive described as follows. The cylindrical hollow stator is mounted in the interior of head support 1 and the rotor is attached to housing member 40 and/or to housing 21 of spindle motor 22.

An alternative support arrangement can provide stable support of swivel head 5. This arrangement is highly loadable in the axial and radial directions and enables accurate easy rotary motions of the swivel head about axis of rotation 27. In order to fix the swivel head at preselected positions, also in the case of extremely high loads, an additional clamping means can be provided between a suitable component of the head support and the swivel head. This clamping means can be actuated hydraulically and/or mechanically and has at least one disk-like or sleeve-like clamping element as shown, for example, in German patent publications 195 22 711 and 41 22 711. In addition, the flexible pipe, elbow connector, and adapter can also be used for other machining units which have a swivel head rotatable about a 45° axis of rotation and have a fixedly attached working spindle.

While the present invention has been illustrated and described by means of specific embodiments, it is to be understood that numerous changes and modifications can be made therein without departing from the spirit and scope of the invention. Accordingly, the invention is limited only by the claims.

What is claimed is:

1. A machining unit for a program-controlled milling and drilling machine, said machining nit comprising:
   a head support movable in at least one coordinate axis, said support having a front portion and an axis of rotation pointing forward and downward by 45° relative to vertical;
   a swivel head arranged on the front portion of the head support;
   a spindle head fixedly attached to the swivel head, said spindle head further comprising a working spindle, said spindle head being arranged at an axis at an angle of 45° relative to said axis of rotation of said head support;
   a spindle motor mounted in the head support, said motor having a shaft and being aligned coaxially with respect to said axis of rotation of said head support,
   a bevel gear arranged on a protruding end of the shaft,
   the swivel head further having a cylindrical hollow housing member coaxial with respect to the axis of rotation of the head support, and the head support having a housing neck in which the housing member of the swivel head is rotatably supported; and
   the head support further comprises a rotary drive for turning the swivel head around the axis of rotation of the head support together with the spindle motor.

2. The machining unit of claim 1, wherein said rotary drive has a clearance-free clamped gear train including a toothed belt drive and a pinion, said pinion constantly engaging a spur ring mounted on the spindle motor.

3. The machining unit of claim 2, wherein a speed changing gear arrangement is positioned downstream of the bevel gear.

4. The machining unit according to claim 3, wherein at least one supporting ring is mounted in the housing neck of the head support, and wherein said at least one supporting ring is supported in at least one peripheral groove formed in the housing member of the swivel head.

5. The machining unit according to claim 4, wherein a front half portion of a spindle motor housing is fixed by the housing member of the swivel head and a rear portion of the spindle motor housing containing ring projects into the head support.

6. The machining unit of claim 1, wherein a speed changing gear arrangement is positioned downstream of the bevel gear.

7. The machining unit according to claim 1, wherein at least one supporting ring is mounted in the housing neck of the head support, and wherein said at least one supporting ring is supported in at least one peripheral groove formed in the housing member of the swivel head.

8. The machining unit according to claim 7, wherein a front half portion of a spindle motor housing is fixed by the housing member of the swivel head and a rear portion of the spindle motor housing containing ring projects into the head support.

9. The machining unit according to claim 1, wherein a front half portion of a spindle motor housing is fixed by the housing member of the swivel head and a rear portion of the spindle motor housing containing ring projects into the head support.

10. The machining unit according to claim 1, wherein the spindle head has a box-like rear portion and wherein an external flexible pipe adapted for protecting electrical and liquid lines extends from the head support to said box-like rear portion.

11. The machining unit according to claim 10, wherein the flexible pipe is connected to the head support via a rotating elbow connector and is pivotably connected to the box-like rear portion of the spindle nose via an adapter.

12. The machining unit according to claim 11, wherein the adapter contains a bushing having convex external surfaces against which a pivotable end ring abuts in a sliding fit.

13. The machining unit according to claim 12, wherein rolling elements are supported in the adapter.

14. The machining unit according to claim 11, wherein rolling elements are supported in the adapter.

* * * * *